United States Patent [19]

McEuen et al.

[11] 4,438,080

[45] Mar. 20, 1984

[54] PROCESS FOR OXIDIZING THALLIUM (I) TO THALLIUM (III)

[75] Inventors: Bruce K. McEuen, Hopewell; Robert D. Norris, Cranbury, both of N.J.

[73] Assignee: FMC Corporation, Philadelphia, Pa.

[21] Appl. No.: 447,367

[22] Filed: Dec. 6, 1982

[51] Int. Cl.³ .............................................. C01G 15/00
[52] U.S. Cl. .................................... 423/112; 423/111; 423/624; 260/429 R
[58] Field of Search ............... 423/111, 592, 112, 624; 260/429 R

[56] References Cited

U.S. PATENT DOCUMENTS 4,169,809 10/1979 Pugach .............................. 423/111

Primary Examiner—Herbert T. Carter
Attorney, Agent, or Firm—Richard E. Elden; Eugene G. Horsky

[57] ABSTRACT

A process was developed to optimize the thallium (III) produced by the reaction of hydrogen peroxide and thallium (I). In the optimized process, thallium (III) is removed from the reaction mixture during the oxidation reaction.

9 Claims, No Drawings

PROCESS FOR OXIDIZING THALLIUM (I) TO THALLIUM (III)

This invention relates to the oxidation of thallous compounds to thallic compounds.

Oxythallation reactions are well known and described in the literature. These reactions involve the addition of an inorganic thallium (III) salt to an unsaturated organic substance, such as an olefin, acetylene, ketone, or aldehyde. In U.S. Pat. No. 3,641,067, Kruse discloses the use of a thallic carboxylate, such as thallic acetate, to oxidize olefins in an acid solution to the corresponding epoxides. For this process to be practical it is necessary for an economic method to oxidize thallium (I) to thallium (III) so that thallium values can be recycled.

MacLean et al in U.S. Pat. No. 3,479,262, propose the electrolytic oxidation of an acid solution of thallium (I) sulfate to thallium (III) sulfate and the use of the acidic solution to oxidize olefins. The use of molecular oxygen has been proposed in U.S. Pat. No. 3,399,956; U.S. Pat. No. 4,113,756; U.S. Pat. No. 4,115,419; and U.S. Pat. No. 4,192,814; the use of molecular oxygen generally requires, in addition, the use of catalysts and promoters; and to be economical, the use of high-pressure oxygen. In addition, the molecular oxygen processes usually require high alloy equipment because of the use of an acidic media in the presence of oxygen.

U.S. Pat. No. 4,115,419 and U.S. Pat. No. 4,115,421 suggest the use of organic hydroperoxide to oxidize an acidic solution of thallium (I) to thallium (III) and have the added requirement of the use of a Group VIII noble metal compound as a catalyst. The organic hydroperoxide processes have the disadvantage of the high cost of the noble metal catalyst, plus the problem of disposing of the organic co-product formed from the hydroperoxide.

U.S. Pat. No. 4,226,790 suggests the use of an organic peracid to oxidize the thallium (I) to thallium (III). This process not only has the disadvantage of producing an unwanted co-product, the carboxylic acid, which must be recovered, but also uses a catalyst such as ruthenium, which is very expensive, or manganese, which must be separated from the solutions.

Hill et al, in U.S. Pat. No. 3,436,409, state that thallium (III) can be regenerated by known techniques, for example, chemically, as by reaction with molecular oxygen, hydrogen peroxide and the like, or by electrolytic methods. However, Hill et al do not disclose how hydrogen peroxide can be used for this purpose. The authority for this reference to hydrogen peroxide oxidizing thallium (I) to thallium (III) presumably is based on a literature reference by Rabe, O., in Zeit. Anorg. Chem., 48, (1906) pages 427 to 440.

Rabe relates that the reaction between elemental thallium with hydrogen peroxide was first described in 1864 by Schönbein who observed that hydrogen peroxide initially oxidizes thallium to a higher oxide; the hydrogen peroxide then reacts with the higher oxide, reducing it with the evolution of oxygen. Rabe found that the extremely insoluble chocolate-brown thallic oxide could be formed in a strongly alkaline solution using a 100 percent excess of hydrogen peroxide.

Until now, it was generally accepted that hydrogen peroxide would not oxidize thallium (I) to thallium (III) except in a strongly alkaline solution. In co-pending U.S. application Ser. No. 447,368 by Lance R. Byers, filed concurrently, which is incorporated into this application by reference, it is disclosed that thallium (I) can be oxidized to thallium (III) by hydrogen peroxide at a pH of 9 or less, that is in weakly alkaline solutions or in acidic solutions, as well as in the strongly alkaline solutions taught by the prior art. It is convenient to report the efficacy of the oxidation by the percentage yield of thallium (III) based on the reaction of thallium (I), with the stoichiometric quantity of hydrogen peroxide, this percent yield is defined for the purpose of this invention the "Percent Conversion" (% Conversion). The Percent Conversion is a function of pH.

In accordance with the process of the present invention, the efficiency of the conversion of thallium (I) to thallium (III) with respect to the hydrogen peroxide as measured by the Percent Conversion can be improved by removing the thallium (III) from the reaction mixture continuously or periodically during its formation. This improvement is observed in acid solutions where the thallium (III) is present as an cation and in alkaline solutions where the thallium (III) is present as insoluble thallium (III) oxide hydrate; the existence of the hydroxide is considered unlikely.

No explanation is known for this suprising phenomena. It is obvious to one skilled in the art that any such explanation must include both the homogeneous catalytic reaction at a pH less than 7 and heterogeneous catalytic reaction at a pH greater than 7.

Removal of the thallium (III) from solution may be by any convenient means. If thallium (III) hydroxide is formed, it may be removed by any solid-liquid separation method, such as by filtering or centrifuging the mixture. If the thallium (III) is present as a soluble cation at a pH of less than 7, the Percent Conversion of the thallium (I) to thallium (III) with respect to the hydrogen peroxide can be improved by removing the thallium (III) ion by means, such as ion exchange or solvent extraction, using a carboxylic acid containing at least 5 carbon atoms per acid molecule as disclosed by Pugach in U.S. Pat. No. 4,169,809 or by removing the thallium (III) from the reaction mixture by reacting it with an olefin, acetylene, aldehyde, or a ketone, thereby forming thallium (I). Alternatively, the thallium (III) may be removed from the reaction mixture by reacting the thallium (III) with an organic compound to form a covalent organothallium (III) compound, such as an alrylthallium (III) which is formed by the reaction of thallium (III) with an aromatic compound. Preferably, the latter reaction solution contains trifluoroacetic acid as the solvent and the aryl thallium (III) compound is present as the arylthallium (III) ditrifluoroacetate.

Other preferred embodiments of the present invention will be apparent to one skilled in the art by the following nonlimiting examples.

EXAMPLE 1

Two solutions were prepared, each containing 2.524 grams (5 millimols) of thallous sulfate in 100 milliliters of water. The solutions were adjusted to pH 15 using 60% potassium hydroxide. The stoichiometric amount, 0.486 grams, of 70% hydrogen peroxide was added to each in four equal increments at approximately 15 minute intervals. One sample was filtered just prior to each subsequent hydrogen peroxide addition. Both samples were filtered 15 minutes after the last addition of hydrogen peroxide. Unconverted thallium (I) was determined by iodate titration and thallium (III) was determined by difference. The Percent Conversion with and without the removal of thallium (III) formed during the run is reported in Table I.

EXAMPLE 2

Example 1 was repeated at pH 12.

EXAMPLE 3

Example 1 was repeated at pH 9. Very little thallium oxide precipitate was observed. The results reported as Percent Conversion in Table I are inconsistent with the other examples. The explanation for this inconsistency is not known but is not considered significant as the typical Percent Conversion at pH 9 is only 20%.

EXAMPLE 4

Example 1 was repeated at pH 7. No precipitate was obtained, therefore no thallium III was removed during the run and the only Percent Conversion determination was without thallium (III) removal.

EXAMPLE 5

Two (2) solutions were prepared containing 0.2525 grams (0.5 millimols) of thallous sulfate in 20 milliliters of water at pH 5. The stoichiometric amount, 0.0486 grams, of hydrogen peroxide was added to each in four equal increments at 60 minute intervals.

Fifty (50) minutes after each of the first three additions one of the solutions was passed through a 10 milliliter volume of a chelating ion exchange resin which had originally been charged with hydrogen ions. Thirty (30) minutes after the final addition of hydrogen peroxide, the column was purged of any thallium (I) ions and the unoxidized thallium (I) was determined for both solutions. The Percent Conversion was calculated by difference and reported in Table I. The solution treated to remove thallium (III) by the ion exchange resin had decreased in pH to 2.

TABLE I

Effect of pH and of Removing Thallium (III) on Hydrogen Peroxide Usage

| Example | pH | Percent Conversion with Thallium (III) Removed | with Thallium (III) Not Removed |
| --- | --- | --- | --- |
| 1 | 15 | 90.8 | 66.6 |
| 2 | 12 | 18.5 | 5.4 |
| 3 | 9 | 5.7 | 37.7 |
| 4 | 7 | * | 22.5 |
| 5 | 5** | 88.4 | 74.4 |

*no precipitate; assay not determined
**pH = 2 for sample with thallium (III) removed.

What is claimed is:
1. In the process for oxidizing ions of thallium (I) contained in a reaction solution to thallium (III) using hydrogen peroxide as the oxidizing agent wherein the improvement comprises removing at least part of the thallium (III) from the reaction solution during the oxidation process.

2. The process of claim 1 wherein thallium (III) is removed by reacting the thallium (III) with a compound capable of reducing the thallium (III) to thallium (I).

3. The process of claim 2 wherein the compound capable of reducing the thallium (III) is an olefin, an acetylene, a ketone, or an aldehyde.

4. The process of claim 1 wherein the pH of the reaction solution is greater than 7 and the thallium (III) is removed by separating thallium (III) from the reaction solution by filtering or centrifuging it as thallium (III) oxide.

5. The process of claim 1 wherein the pH of the reaction solution is 7 or less and the thallium (III) ion is removed from the reaction solution by extracting with a solvent.

6. The process of claim 1 wherein the pH of the reaction solution is 7 or less and the thallium (III) ion is removed from the reaction solution by use of an ion exchange resin.

7. The process of claim 1 wherein the pH of the reaction solution is 7 or less and the thallium (III) ion is removed from the reaction solution by reacting the thallium (III) with an aromatic compound to form a thallium (III) compound.

8. The process of claim 7 wherein the reaction solution contains trifluoroacetic acid as a solvent and the arylthallium (III) compound is arylthallium (III) ditrifluoroacetate.

9. The process of claim 1 wherein the pH of the reaction solution is 7 or less and the thallium (III) ion is removed from the reaction solution by reacting the thallium (III) with an olefin, an acetylene, a ketone, or an aldehyde.

* * * * *